US012695232B2

(12) United States Patent
Kleeberger et al.

(10) Patent No.: US 12,695,232 B2
(45) Date of Patent: Jul. 28, 2026

(54) CONTACT DEVICE, ELECTRICAL COMPONENT UNIT, METHOD, AND USE OF A CONTACT DEVICE IN AN ELECTRICAL COMPONENT UNIT

(71) Applicant: OECHSLER AG, Ansbach (DE)

(72) Inventors: Friedrich Kleeberger, Herrieden (DE); Martin Danner, Stopfenheim (DE); Steffen Neumann, Gerolfingen (DE); Peter Stanislawski, Ansbach (DE); Denise Hurtienne, Nuremberg (DE); Heinz Soellinger, Ansbach (DE); Ganime Murad, Gunzenhausen (DE); Edwin Schoenrock, Wenden (DE); Dominic Gruss, Herdecke (DE)

(73) Assignee: OECHSLER AG, Ansbach (DE)

( * ) Notice: Subject to any disclaimer, the term of this patent is extended or adjusted under 35 U.S.C. 154(b) by 277 days.

(21) Appl. No.: 18/467,822

(22) Filed: Sep. 15, 2023

(65) Prior Publication Data

US 2024/0097370 A1 Mar. 21, 2024

(30) Foreign Application Priority Data

Sep. 19, 2022 (DE) ..................... 10 2022 123 912.8

(51) Int. Cl.
*H01R 13/24* (2006.01)
*H01R 43/26* (2006.01)

(52) U.S. Cl.
CPC ......... *H01R 13/2457* (2013.01); *H01R 43/26* (2013.01)

(58) Field of Classification Search
CPC ............................ H01R 13/2457; H01R 43/26
(Continued)

(56) References Cited

U.S. PATENT DOCUMENTS 5,382,169 A * 1/1995 Bailey ................ H01R 13/2471 439/700
5,383,800 A * 1/1995 Saka .................. H01H 85/2035 439/852

(Continued)

FOREIGN PATENT DOCUMENTS

DE 19723280 A1 12/1998
DE 102018123994 A1 4/2020

(Continued)

OTHER PUBLICATIONS

Extended European Search Report dated Jan. 29, 2024, issued in corresponding European Application No. 23194751.6. (8 pages).

(Continued)

*Primary Examiner* — Gary F Paumen
(74) *Attorney, Agent, or Firm* — BUCHANAN, INGERSOLL & ROONEY PC

(57) ABSTRACT

A contact device includes a first plug connector, which for forming a plug contact is pluggable onto a corresponding second plug connector of a first component, and comprising at least one first abutment section, which for forming a pressure contact is pressable against a second abutment section of a second component and/or of an additional element that is connectable to the second component. At least one spring section is provided between the first plug connector and the first abutment section and/or between a fastening section of the additional element and the second abutment section. The spring section presses the two abutment sections against one another with an elastic force when the two components are electrically connected to one another. The first plug connector is designed as a push-on sleeve, so that it is pluggable onto a second plug connector, designed as a plug, of the first component.

17 Claims, 6 Drawing Sheets

Figure 1:
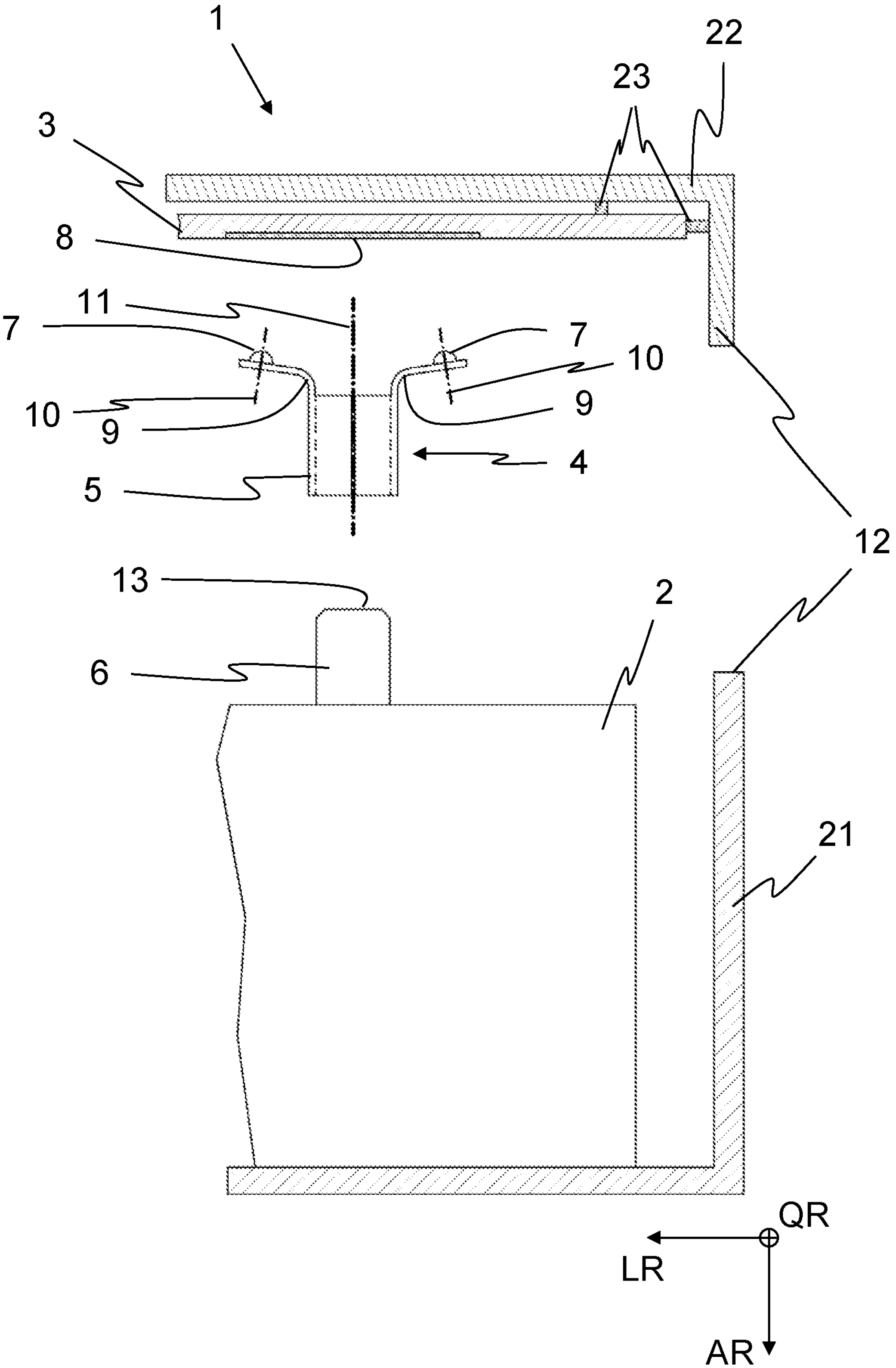

(58) Field of Classification Search
USPC .................................... 439/66, 382, 383, 259
See application file for complete search history.

(56) References Cited

U.S. PATENT DOCUMENTS

| | | | | | |
|---|---|---|---|---|---|
| 5,718,592 | A * | 2/1998 | Hosler, Sr. ........... | H01R 12/716 439/83 |
| 5,733,133 | A * | 3/1998 | Matsumura .......... | H05K 7/1023 439/82 |
| 5,752,840 | A * | 5/1998 | Wu .................... | H01R 13/6658 439/736 |
| 5,764,487 | A * | 6/1998 | Natsume ............. | B60R 16/0238 361/823 |
| 5,823,798 | A * | 10/1998 | Zintler ................... | H05K 7/026 439/76.2 |
| 6,183,269 | B1 | 2/2001 | Sarkissian et al. | |
| 8,814,577 | B2 | 8/2014 | Nohira et al. | |
| 10,547,136 | B2 | 1/2020 | Ho | |
| 11,411,334 | B2 | 8/2022 | Peterson et al. | |
| 2021/0344127 | A1 | 11/2021 | Herges | |
| 2023/0105384 | A1 | 4/2023 | Deeg et al. | |

FOREIGN PATENT DOCUMENTS

| | | | |
|---|---|---|---|
| DE | 102020105298 | A1 | 9/2021 |
| EP | 1398862 | A2 | 3/2004 |

OTHER PUBLICATIONS

German Search Report dated May 26, 2023, 6 pages.
Office Action (Mitteilung gemäß Artikel 94 (3) EPÜ) issued on Nov. 6, 2025, in corresponding European Patent Application No. 23194751.6. (47 pages).

* cited by examiner

CONTACT DEVICE, ELECTRICAL COMPONENT UNIT, METHOD, AND USE OF A CONTACT DEVICE IN AN ELECTRICAL COMPONENT UNIT

The present invention relates to a contact device, in particular for an electromotive actuator, for establishing an electrical connection between a first component, in particular a motor, and a second component, comprising a first plug connector, which for forming a plug contact is pluggable onto a corresponding second plug connector of the first component, and comprising at least one first abutment section, which for forming a pressure contact is pressable against a second abutment section of the second component and/or of an additional element that is connectable to the second component, at least one spring section being provided between the first plug connector and the first abutment section, and/or between a fastening section of the additional element and the second abutment section, the spring section pressing the two abutment sections against one another with an elastic force when the two components are electrically connected to one another. Moreover, the invention relates to an electrical component unit, in particular an electromotive actuator, and to a method for manufacturing and/or installing an electrical component unit. Furthermore, the invention relates to use of a contact device in an electrical component unit.

Contact devices for establishing an electrical connection between a first component, in particular a motor, and a second component are known in the prior art in different variations. Frequently, the two components are electrically connected to one another or contacted by means of soldered or welded joints, press-fit pin connections, and/or a crimp contact in combination with a flexible litz wire. The connection or contacting as soldered or welded joints and/or press-fit pin connections has the disadvantage that the two components are rigidly connected to one another, and therefore no tolerance compensation can take place. In addition, such connections have the disadvantage that they may be damaged by mechanical stresses and/or vibrations. Although connections or contactings by means of a crimp contact in combination with a flexible litz wire decouple the two components, as the result of which tolerance compensation is possible, they have the disadvantage that this type of contacting results in high costs for individual parts and a high level of installation effort.

In addition, contact devices including a spring section for forming a pressure contact are known in the prior art. Thus, EP 1 398 862 A2 describes a connection terminal for the windings of a stator of an electric motor. The connection terminal comprises on the one hand a connection for wires of the stator windings of the electric motor, and on the other hand, a leaf spring for forming the pressure contact. This connection terminal has the disadvantage that in order to fasten the connection terminal to the electric motor, a corresponding plug socket must be provided at the electric motor for the connection. Thus, the electric motor or its motor housing must be specifically designed for use of this connection terminal, as the result of which this electric motor has little or no suitability for other applications. In addition, problems with the contact of the connection to the wires of the stator may arise if the wires shift during installation.

The object of the present invention is to eliminate the disadvantages known from the prior art. The object in particular is to provide a contact device that provides reliable contacting of the two components, and at the same time provides mechanical decoupling, simple installation, high tolerance compensation, and/or low costs.

The object is achieved by a contact device, an electrical component unit, a method for manufacturing and/or installing an electrical component unit, and/or use of a contact device having the features of the independent claims.

A contact device for establishing an electrical connection between a first component and a second component is proposed. The contact device electrically contacts the two components to one another so that an electrical signal and/or electrical energy may be conducted from one of the components to the other. The contact device is thus made, at least partially, of an electrically conducting material and/or includes at least one electrically conducting material. The first component is preferably designed as a motor, in particular an electric servomotor. The second component preferably has at least one strip conductor by means of which the motor is electrically connectable. The second component may be, for example, a printed circuit board, a board, and/or a lead frame or a contact plate that have/has at least one strip conductor. The contact device contacts the two components to one another so that the electrical component unit is in operative electrical connection. For mechanically connecting the two components, the electrical component unit may additionally include a fastening device. When the first component is designed as a motor and the second component is designed as a printed circuit board, board, and/or lead frame or contact plate, the electrical component unit is designed as an electromotive actuator.

The contact device includes a first plug connector, which for forming a plug contact is pluggable onto a corresponding second plug connector of the first component. In addition, the contact device includes at least one first abutment section, which for forming a pressure contact is pressable against a second abutment section of the second component and/or of an additional element that is connectable to the second component, at least one spring section being formed between the first plug connector and the first abutment section, and/or between a fastening section of the additional element and the second abutment section, the spring section pressing the two abutment sections together with an elastic force when the two components are electrically connected to one another.

When the first plug connector is plugged onto the second plug connector, the contact device is electrically connected to the first component. When the second abutment section is situated at the second component, the contact device in abutment with the second component is directly electrically connected. When the second abutment section is situated at the additional element, the contact device in abutment with the second component is indirectly electrically connected via the additional element. The additional element is connected, in particular mechanically and/or electrically, to the second component via the fastening section. When the first plug connector is plugged onto the second plug connector, and the first abutment section rests against the second abutment section, the first component is electrically connected to the second component via the contact device.

According to the invention, the first plug connector is designed as a push-on sleeve, so that it is pluggable onto a second plug connector, designed as a plug, of the first component. A plug is understood as the male component, and the push-on sleeve is understood as the female component, of a plug connection. Plugs are understood as contact plugs or contact blades that protrude from the first component along an insertion direction. The length of the plug along the insertion direction, onto which the push-on sleeve is pluggable, may also be referred to as the plugging length. The plug and/or the push-on sleeve are/is preferably designed as an electrically conductive plate element.

The plug is preferably designed as a flat plug having a rectangular cross section, as a round plug having a circular cross section, and/or as a square plug having a square cross section. The push-on sleeve is preferably designed as a flat push-on sleeve, round push-on sleeve, or square push-on sleeve, corresponding to the plug. Flat plugs are understood to mean contact plugs or contact blades. The length of the flat plug along the insertion direction, onto which the flat push-on sleeve is pluggable, may be referred to as the plugging length. For the flat plug, the insertion width along a longitudinal direction is several times greater than the insertion thickness along a transverse direction. For the square plug, the insertion width along the longitudinal direction is equal to the insertion thickness along the transverse direction.

A push-on sleeve is understood to mean sleeve-shaped contacts that are pluggable onto the plug and thus ensure an electrical connection. Push-on sleeves are preferably understood to mean electrically conductive plate elements that are bent into a sleeve shape. When the push-on sleeve is plugged onto the plug, the plug is automatically aligned by form fit, in particular along the longitudinal direction and/or the transverse direction, and is detachably fixed in a force-fit manner, in particular along the insertion direction.

The first component may be produced very easily as a mass-produced product with the second plug connector designed as a plug, in particular as a flat plug. These types of first components, in particular motors, are already known from the prior art for use with crimp contacts in combination with a flexible litz wire, and may thus be used without major changes. Since the contact device has a corresponding second plug connector designed as a push-on sleeve, in particular as a flat push-on sleeve, the installation effort may thus be kept very low. Due to the form-fit and force-fit connection of the plug and the push-on sleeve, also no additional socket is necessary, which reduces the manufacturing costs for the first component.

The two abutment sections rest against one another in such a way that a pressure contact or an abutment contact is formed. In the state in which the two abutment sections rest against one another, they may be displaced relative to one another along the longitudinal direction and/or transverse direction. A mechanical decoupling of the two components along the longitudinal direction and/or the transverse direction may thus be ensured with the aid of the two abutment sections of the contact device. Despite a possible movement along the longitudinal direction and/or transverse direction, the two components are in operative electrical connection with one another. In addition, due to the spring section, the mechanical decoupling along the insertion direction may also be ensured, since the spring may cushion the movement along the insertion direction.

It is advantageous when the first plug connector has an open design along the insertion direction. The first plug connector may have a design that is open on one side or on both sides. The first plug connector may be plugged onto the second plug connector through the at least one opening, as a result of which the above-mentioned form-fit connection may be ensured. Thus, an additional fastening socket for the contact device is not necessary. When the first plug connector has a design that is open on both sides, the second plug connector may protrude through the first plug connector. As a result, the length of the first plug connector along the insertion direction is independent of the length of the second plug connector, resulting in less planning effort and/or lower installation costs.

Additionally or alternatively, it is advantageous when the first plug connector, in the state in which it is plugged onto the second plug connector, extends beyond a free end of the second plug connector along the insertion direction. It may thus be ensured that the second plug connector does not touch the second components, even during movement. The mechanical decoupling of the two components along the insertion direction is ensured in this way.

It is also advantageous when the elastic force acts along a spring axis, the spring axis preferably extending along the insertion direction, a longitudinal direction, and/or a transverse direction, and/or forming an acute angle with the insertion direction, the longitudinal direction, and/or the transverse direction.

When the spring axis extends along the insertion direction and/or at the acute angle with respect to the insertion direction, due to the small angle the smallest possible transverse force acts on the first plug connector and/or the second plug connector along the longitudinal direction and/or the transverse direction. In addition, during installation of the electrical component unit, the two components are preferably fastened to one another along the insertion direction with the aid of the fastening device. During installation, the fastening device may introduce a fastening force that acts against the elastic force. Due to the angle, which is as acute as possible, between the insertion direction and the spring axis, a fastening force along the insertion direction thus acts against the elastic force.

Additionally or alternatively, the abutment sections rest against one another normal to the insertion direction. Due to the angle, which is as acute as possible, between the insertion direction and the spring axis, an abutment of the two abutment sections that is as secure and uniform as possible may be provided.

When the spring axis extends along the longitudinal direction and/or transverse direction, and/or at the acute angle with respect to the longitudinal direction and/or transverse direction, the elastic force acts transversely with respect to the insertion direction. As a result, the introduction of a fastening force for overcoming the elastic force is not absolutely necessary. The abutment sections advantageously rest against one another normal to the longitudinal direction and/or transverse direction. Due to the angle, which is as acute as possible, between the longitudinal direction and/or the transverse direction and the spring axis, an abutment of the two abutment sections that is as secure and uniform as possible may be provided.

In addition, it is advantageous when the contact device includes multiple spring sections, from whose individual elastic forces and/or individual spring axes the elastic force, which acts along the spring axis, results. The resulting elastic force may be adjusted via multiple of the spring sections. In addition, the elastic force or the overall spring axis of the elastic force may be shifted and/or adjusted via multiple of the spring sections, which preferably have different individual spring axes.

It is also advantageous when the contact device includes a support section for supporting the contact device on the first component. The elastic force on the first component may be supported by the support section, so that the elastic force may be used, at least for the most part, for forming the pressure contact or abutment of the two abutment sections on one another. In addition, such an arrangement results in a stable deflection of the at least one spring section. Furthermore, the spring axis may be shifted and/or adjusted by means of the support section. The support section is preferably situated at the first plug connector, between the first plug connector and the at least one spring section, and/or between the at least one spring section and the first abutment section.

It is also advantageous when the at least one first abutment section is spaced apart from the first plug connector and/or the support section in the insertion direction.

It is likewise advantageous when the spring axis extends centrally with respect to at least one of the abutment sections, with respect to the first plug connector, and/or with respect to the support section. As described above, the elastic force acts along the spring axis. When the spring axis extends centrally with respect to at least one of the abutment sections, with respect to the first plug connector, and/or with respect to the support section, it may be ensured that little or no transverse forces and/or torques act on the first plug connector and/or the second plug connector.

It is also advantageous when the at least one spring section is designed as at least one bent spring arm, at the end of which the at least one abutment section is situated. The contact device is preferably designed as a bent metal part. The manufacture of the contact device may be simplified due to the design of the spring section as a bent spring arm, since the spring section may also be bent during the bending operation. The arrangement of the at least one abutment section at the end of the spring arm also simplifies the introduction of the elastic force for forming the pressure contact.

It is likewise advantageous when at least one of the abutment sections is designed as an abutment surface, abutment arc, abutment bracket, abutment point, and/or abutment end. When the at least one second abutment section of the second component is designed as an abutment surface, the at least one first abutment section of the contact device is preferably designed as at least one abutment point, abutment arc, abutment bracket, and/or abutment end. When the at least one second abutment section of the additional element is designed as at least one abutment point, abutment arc, abutment bracket, and/or abutment end, the at least one first abutment section of the contact device is preferably designed as an abutment surface. It may thus always be ensured that the two abutment sections rest against one another, even in the event of tolerances and/or external mechanical effects.

It is also advantageous when the at least one first abutment section, rests, in particular directly, against the at least one second abutment section of the second component and/or of the additional element.

It is likewise advantageous when the contact device has multiple first abutment sections and/or second abutment sections, so that the contact device is multiply electrically connected to the second component. In this way the mutual abutment may be increased, and the resistance may thus be reduced. In addition, due to multiple first abutment sections and/or second abutment sections, the two components are multiply supported, in particular at different positions, along the insertion direction. Tilting of the two components relative to one another may thus be avoided. Furthermore, due to the multiple first abutment sections and/or second abutment sections, the fail-safe operation may be improved, or redundant contacting of the two components by means of the contact device may be provided. If one of the abutment sections should be damaged and/or not rest against the contact device due to faulty installation, for example, another one of the multiple abutment sections may ensure the contacting of the two components.

It is also advantageous when the contact device has a one-part or multi-part design. The one-part contact device is made up of a contact element. The multi-part contact device includes, in addition to the contact element, the additional element and/or a spring section designed as a separate compression spring. A one-part contact device is likewise understood to mean a contact device made up of multiple components fixedly connected to one another.

It is advantageous when the contact element of the multi-part contact device includes the first plug connector and the at least one first abutment section, and/or when the additional element includes the at least one spring section and the at least one second abutment section, the contact element and the additional element resting against one another for electrically connecting the two components via the at least one first abutment section of the contact element and the at least one second abutment section of the additional element. The spring section preferably connects the second abutment section to a fastening section by means of which the additional element is fastened to the second component. The additional element and the contact element of the multi-part contact device may be manufactured more easily than the one-part contact device. In addition, more stable contacting may be ensured when, due to the multi-part contact device, there is a large distance between the two components along the insertion direction. Furthermore, the additional element and the contact element may be installed independently of one another on the particular component, thus reducing the installation effort during final assembly of the electrical component unit.

It is also advantageous when the second abutment section for the one-part contact device is situated at the second component, and/or for the multi-part contact device, is situated at the additional element.

It is also advantageous when the additional element is fastened to the second component, in particular in a non-displaceable manner, by means of the fastening section. The fastening section may mechanically fasten the additional element and/or electrically connect it to the second component. For example, the fastening section may include at least one solder pin, a clip, a pin, and/or a further plug connector.

It is likewise advantageous when the contact device includes a compensation section that compensates for and/or bridges an offset of the second plug connector relative to the second abutment section, the offset being formed along a longitudinal direction and/or transverse direction of the contact device. Due to the design, the second plug connector of the first component and the second abutment section of the second component and/or of the additional element may be spaced apart from one another in the longitudinal direction and/or transverse direction. This may be referred to as an offset. The contact device includes the compensation section to allow this offset to be compensated for in a simplified manner.

In addition, it is advantageous when the compensation section is situated at the contact element of the multi-part and/or one-part contact device.

It is likewise advantageous when the compensation section connects the first plug connector to the support section, to the spring section, and/or to the first abutment section, the compensation section preferably being designed as a compensation loop. The compensation section often directly adjoins the first plug connector. The compensation section, as a compensation loop, in addition to compensating in the longitudinal direction and/or transverse direction may also provide tolerance compensation along the insertion direction. In addition, the compensation along the longitudinal direction and/or transverse direction is simplified with the aid of the compensation loop, since the loop may be widened for this purpose. The compensation section is preferably adjoined by the support section, which supports the contact device, in particular the contact element, on the first component. In this way, the spring section adjoining the support section may act on the first abutment section, adjoining the spring section, with the elastic force along the plugging direction.

It is advantageous when the at least one spring section is designed as a leaf spring and/or compression spring.

It is likewise advantageous when the spring section designed as a leaf spring forms a cohesive unit together with the first plug connector, the first abutment section, the second abutment section, the support section, and/or the fastening section. This results in a very simple design of the contact device, in particular as a bent metal part.

Additionally or alternatively, the spring section designed as a compression spring acts on one of the abutment sections, the first plug connector, and/or the support section. The compression spring is preferably designed as a separate compression spring of the multi-part contact device. The separate compression spring has the advantage that it may be purchased as a standard part, and thus reduces the cost of manufacturing the contact element, in particular without a spring section.

Furthermore, an electrical component unit, in particular an electromotive actuator, is proposed. The electrical component unit comprises a first component, in particular a motor, that includes at least one second plug connector, a second component that has at least one second abutment section and/or that is connectable to an additional element having the second abutment section, and a contact device for establishing an electrical connection between the first component and the second component. The second component, as described above, may be designed as a printed circuit board, board, and/or stamped plate, for example, and may include at least one strip conductor.

According to the invention, the contact device is designed according to the preceding description, it being possible for the stated features to be present individually or in any given combination.

It is advantageous when the first plug connector is designed as a plug, in particular a flat plug, that protrudes from the first component in the insertion direction, and/or when the second abutment section, situated at the second component, is designed as an abutment surface.

Moreover, it is advantageous when at least one fastening device fastens the first component and the second component to one another in the insertion direction in a non-displaceable manner. A fastening device is understood to mean a device that fastens the two components together. The fastening device may include, for example, a housing with at least one housing section, by means of which the two components are fastened together or fixed to one another. The housing preferably includes two housing sections, one of the components being storable or accommodatable in each of the housing sections. Additionally or alternatively, at least one of the components may include at least one housing section. The housing sections may preferably be placed against one another along the insertion direction and/or connected to one another. The housing parts may be welded, screwed, or clipped together, thus forming a housing of the electrical component unit, in particular of the electromotive actuator. The two components are thus fastened, by means of the housing, along the insertion direction in a non-displaceable manner relative to one another.

Since the first component is preferably a motor, a small relative movement of the first component under load may be necessary. The motor under load may thus carry out a rotating movement, a tilting movement, and/or a translation along the transverse direction and/or longitudinal direction. The fastening device, in particular as a housing, may compensate for these relative movements by means of elastic elements, for example.

During installation, the two components are preferably pressed toward one another along the insertion direction and fastened to one another in a non-displaceable manner by means of the fastening device. A pressure contact is thus formed between the two abutment surfaces, the elastic force acting against the fastening force that is introduced by the fastening device.

Furthermore, a method for manufacturing and/or installing an electrical component unit, in particular an electromotive actuator, is proposed. The method according to the invention comprises the following steps: Plugging a first plug connector of a contact device, designed according to the preceding description, onto a corresponding second plug connector of a first component, in particular a motor; and forming a pressure contact between a first abutment section of the contact device and a second abutment section of the second component and/or of an additional element that is connectable to the second component, so that the two components are electrically connected to one another by means of the pressure contact.

The contact device is designed according to the preceding description, it being possible for the stated features to be present individually or in any given combination.

It is advantageous that during the formation of the pressure contact, the two components are fastened to one another with the aid of the fastening device. During the fastening, the two components, as described above, are preferably each situated in a housing section, and the two housing sections are connected to form the housing.

Also proposed is an use of a contact device in an electrical component unit, in particular in an electromotive actuator, for establishing an electrical connection between a first component, in particular a motor, and a second component. The second component, as described above, may be designed as a printed circuit board, board, and/or stamped plate, for example, and may include at least one strip conductor. According to the invention, the contact device is designed according to the preceding description, it being possible for the stated features to be present individually or in any given combination.

Figure 2:
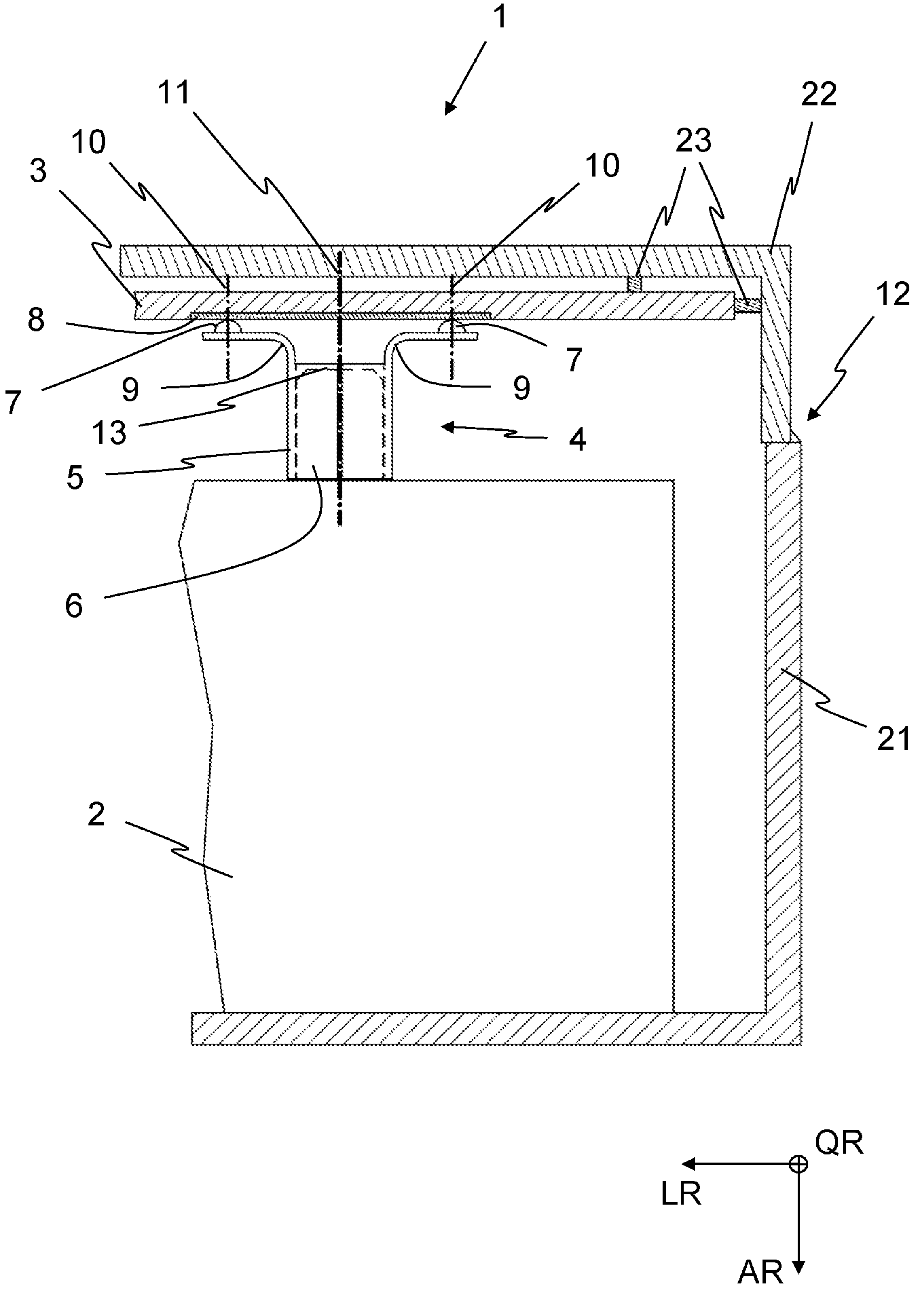
Figure 3:
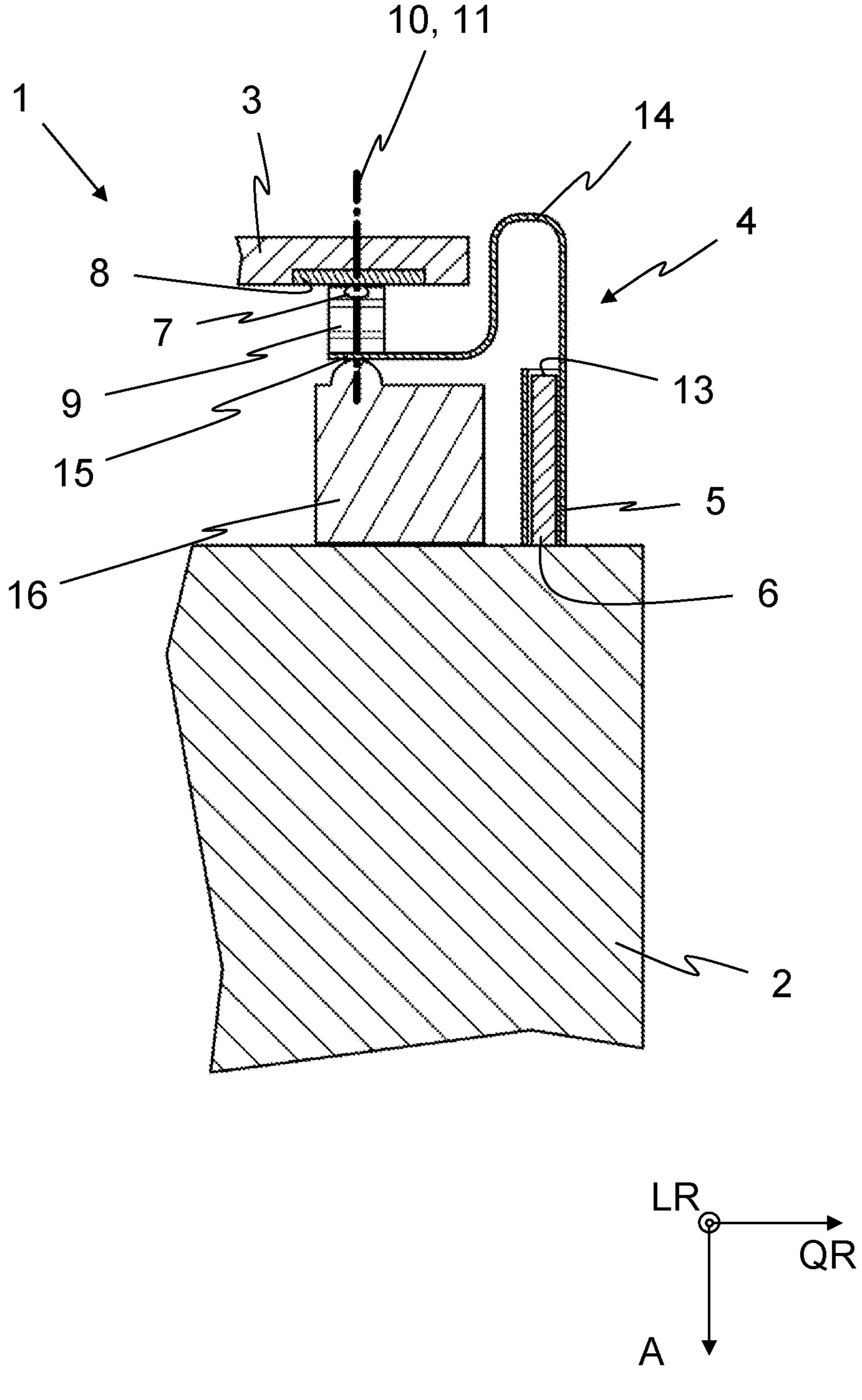
Figure 4:
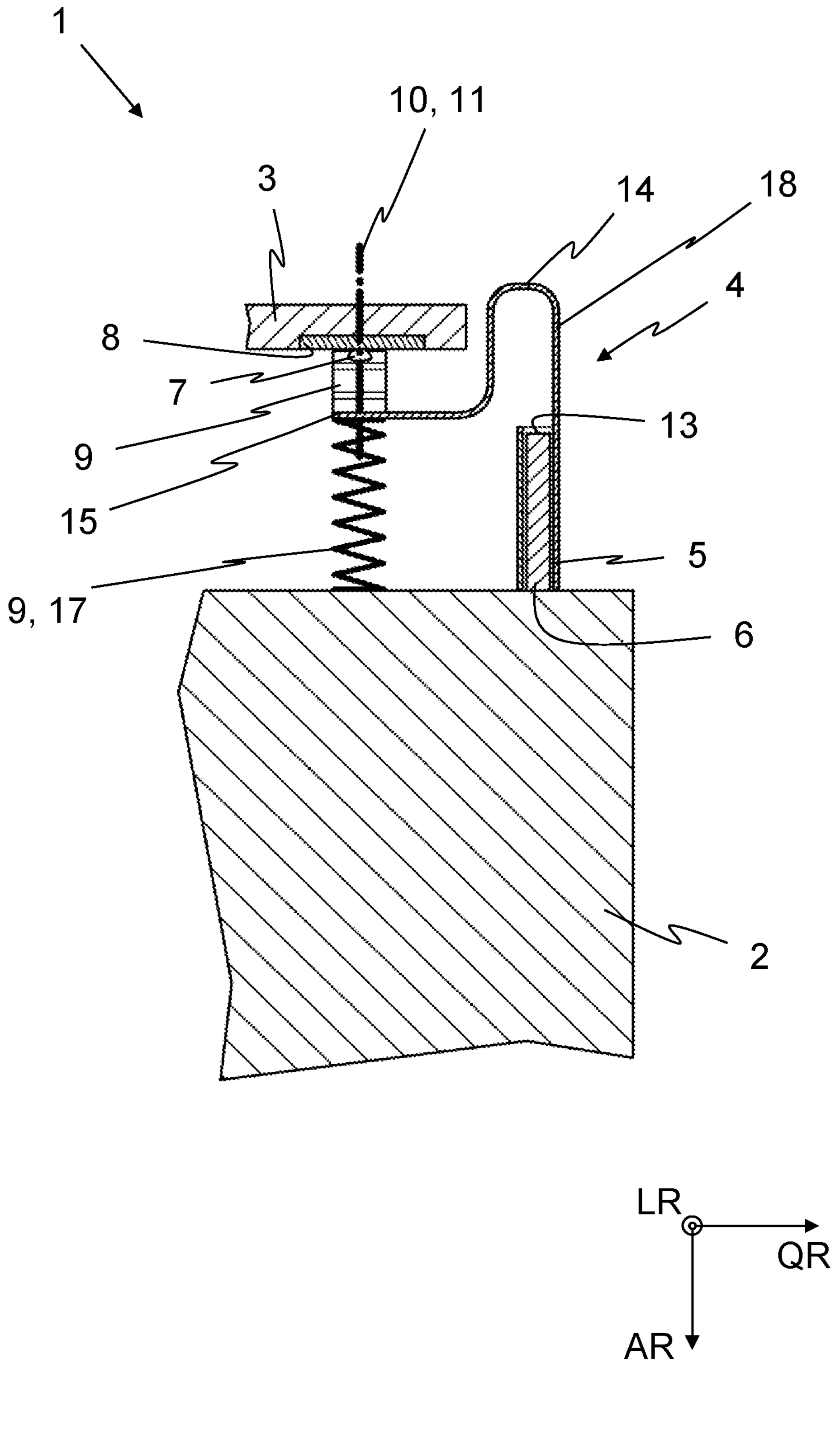
Figure 5:
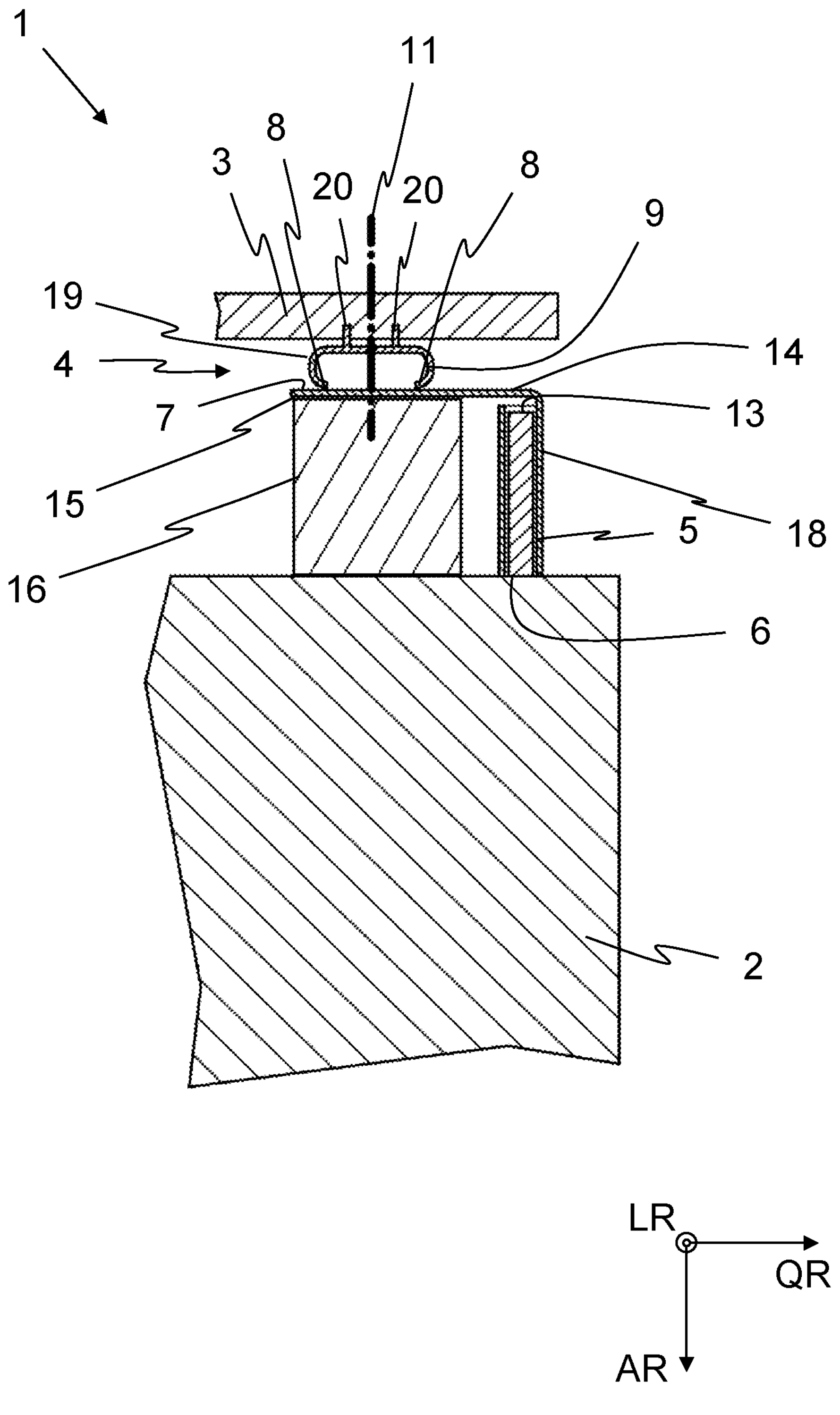
Figure 6:
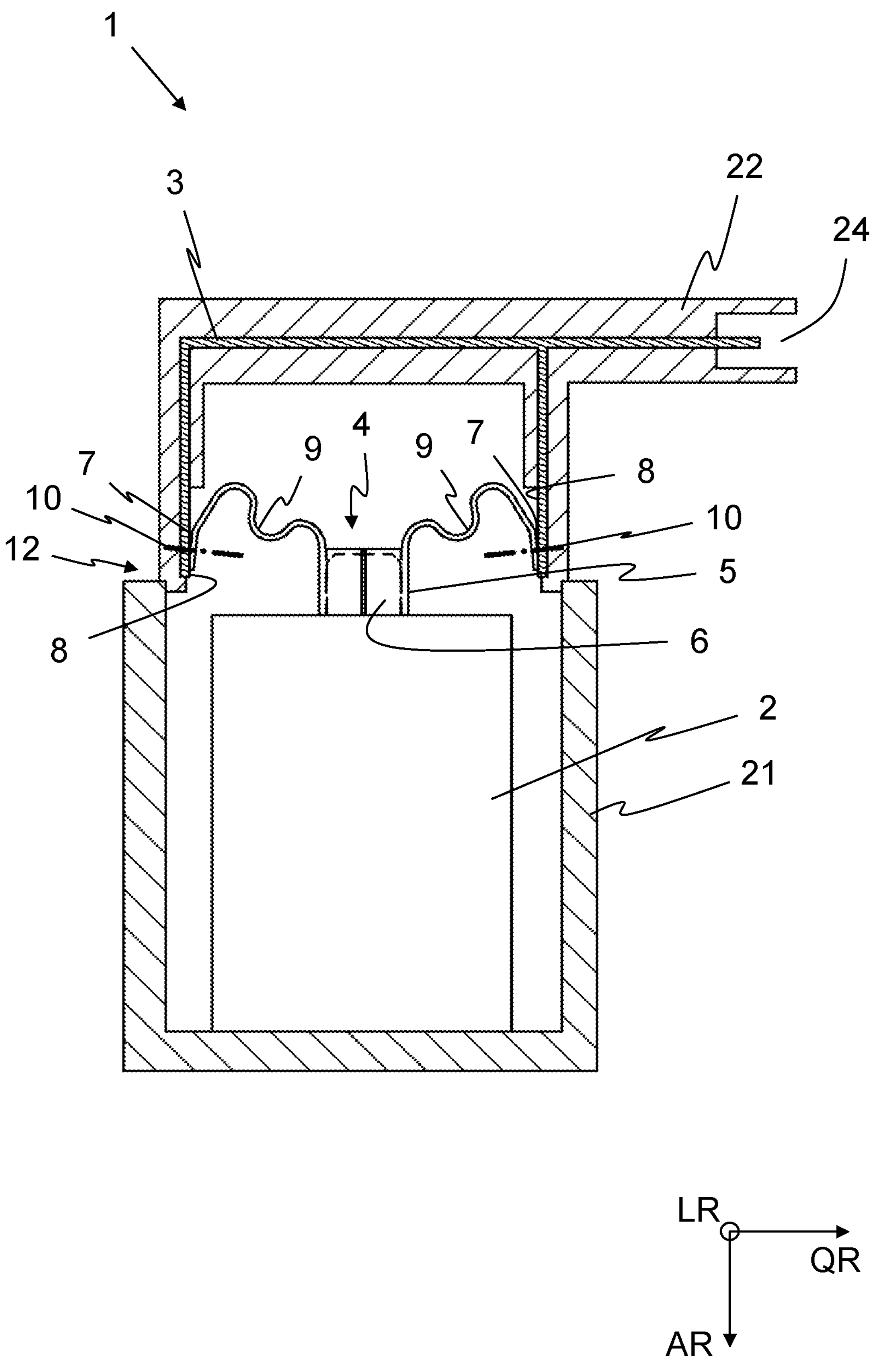

Further advantages of the invention are described in the following exemplary embodiments. In the figures:

FIG. 1 shows a schematic front view of an electrical component unit in a disconnected state according to one exemplary embodiment, FIG. 2 shows a schematic front view of an electrical component unit, similar to the exemplary embodiment in FIG. 1, in an assembled state, FIG. 3 shows a schematic sectional side view of an electrical component unit in an assembled state according to an alternative exemplary embodiment, FIG. 4 shows a schematic sectional side view of an electrical component unit in an assembled state according to a further exemplary embodiment, FIG. 5 shows a schematic sectional side view of an electrical component unit in an assembled state according to a further alternative exemplary embodiment, and FIG. 6 shows a schematic sectional side view of an electrical component unit in an assembled state according to a further alternative exemplary embodiment.

In the following description of the figures, the same reference symbols are used for features that are in each case identical and/or at least comparable in the various figures. The individual features, their configuration, and/or operating principle are usually explained in detail only at their first mention. If individual features are not further explained in detail, their configuration and/or operating principle correspond(s) to the configuration and operating principle of the already described features having the same function or the same name.

FIG. 1 shows a schematic front view of an electrical component unit 1 in a disconnected state according to one exemplary embodiment. The electrical component unit 1 comprises a first component 2, a second component 3, and a contact device 4. The first component 2, the second component 3, and the contact device 4 are spaced apart from one another in the disconnected state. The second component 3 is illustrated in cross section. In addition, for a simplified illustration, only a portion of the first component 2 and of the second component 3 are illustrated. Furthermore, the first component 2, which is designed as a motor, for example, is depicted without an output shaft. The output shaft, not illustrated, may protrude through a recess in the second component 3. For a simplified illustration, the second component 3, which is a printed circuit board or a board and/or a lead frame or a contact plate, for example, is depicted without a strip conductor.

The contact device 4 has a first plug connector 5, which for forming a plug contact is pluggable onto a corresponding second plug connector 6 of the first component 2. According to the invention, the first plug connector 5 is designed as a flat push-on sleeve that is pluggable onto the second plug connector 6 of the first component 2, designed as a flat plug, in an insertion direction AR. In the exemplary embodiment shown, the contact device 4 has a one-part design. The contact device 4 is preferably designed as a bent metal part, it being possible for such a bent metal part to be manufactured in a stamping/bending process, for example. To allow the flat push-on sleeve to be plugged onto the flat plug, the flat push-on sleeve in the insertion direction AR has an open design on at least one side. In the exemplary embodiment shown, the flat push-on sleeve has an open design on both sides. The flat plug or flat push-on sleeve is referred to as "flat" because the insertion width along a longitudinal direction LR is several times greater than the insertion thickness along a transverse direction QR. Alternatively, it is conceivable for the first plug connector 5 to be designed as a round plug and/or square plug, or for the second plug connector 6 to be designed as a round push-on sleeve and/or square push-on sleeve.

The contact device 4 is designed to conduct electrical current and/or electrical signals between the two components 2, 3 of the electrical component unit 1. For this purpose, the electrical component unit 1 preferably has at least two contact devices 4. Thus, with the aid of the second component 3 designed as a printed circuit board, a circuit may be closed, or the first component 2 designed as a motor may be supplied with electrical energy.

For forming a pressure contact, in the illustrated exemplary embodiment at least one first abutment section 7 of the contact device 4 is pressable against a second abutment section 8 of the second component 3. In the exemplary embodiment shown, the contact device 4 includes two first abutment sections 7 that are designed as convex abutment points or contact points. The second abutment section 8, as an abutment surface, is situated at the second component 3. Since the electrical component unit 1 is illustrated in the disconnected state in the exemplary embodiment shown, the first abutment sections 7 do not rest against the second abutment section 8, for which reason no pressure contact is formed.

At least one spring section 9 is situated between the first plug connector 5 and the first abutment section. In the exemplary embodiment shown, in each case a spring section 9 connects one of the two first abutment sections 7 to the first plug connector 5. The spring sections 9 are designed as spring arms. Each of the spring sections 9 has an individual spring axis 10, along which an individual spring force of the spring sections 9 acts when the at least one first abutment section 7 abuts on the at least one second abutment section 8, so that the particular first abutment section 7 and the second abutment section 8 are pressed together. The multiple individual spring axes 10 result in a spring axis 11, along which the elastic force resulting from the individual elastic forces acts when the abutment sections 7, 8 are pressed together.

To mechanically connect the first component 2 to the second component 3, the exemplary embodiment in FIG. 1 has a fastening device 12. The fastening device 12 includes two housing sections 21, 22, for example, the first component 2 being situated at a first housing section 21, and the second component 3 being situated at a second housing section 22. In the exemplary embodiment shown, the second component 3 is situated in a non-displaceable manner at the second housing section 22 along the insertion direction AR, the longitudinal direction LR, and/or the transverse direction QR by means of at least one fastening element 23. The first component 2 is preferably situated in a non-displaceable manner at the first housing section 21 along the insertion direction AR. When the first component 2 is preferably designed as a motor, under load it may be at least slightly moved along the longitudinal direction LR and/or the transverse direction QR. To limit tilting, movement, and/or rotation of the first component 2, in particular the motor under load, within the first housing section 21, the fastening device 12 may include additional elastic elements, not illustrated here in the exemplary embodiment shown.

To assemble the electrical component unit 1, the first plug connector 5 of the contact device 4 is first plugged onto the corresponding second plug connector 6 of the first component 2. The pressure contact may subsequently be formed between the at least one first abutment section 7 of the contact device 4 and the at least [one] second abutment section 8 of the second component 3 by pressing the abutment sections 7, 8 together. The two components 2, 3 are situated at or in the housing sections 21, 22, respectively, and during installation are moved toward one another and/or fastened, as the result of which the pressure contact may be formed and/or maintained. The resulting assembled state is illustrated in FIG. 2.

FIG. 2 shows the electrical component unit 1, similar to the exemplary embodiment in FIG. 1, in the assembled state. As described above, in the assembled state of the electrical component unit 1 the first plug connector 5 of the contact device 4 is plugged onto the second plug connector 6 of the first component 2. The first plug connector 5 of the contact device 4 extends beyond a free end 13 of the second plug connector 6 along the insertion direction AR.

The first abutment sections 7 rest against the second abutment section 8, thus forming a pressure contact. For this purpose, the spring sections 9 press the first abutment sections 7 against the second abutment section 8. The individual elastic forces resulting from the spring sections 9 designed as spring arms act along the individual spring axes 10. Due to the pressing of the abutment sections 7, 8 against one another, the spring sections 9 have deformed, in particular elastically, as a result of which the individual spring axes 10 have shifted and/or rotated. The position and/or orientation of the resulting spring axis 11 are/is the same as in the exemplary embodiment in FIG. 1.

The spring axis 11 extends along the insertion direction AR. In addition, the spring axis 11 extends centrally with respect to the first plug connector 5 and/or with respect to the second plug connector 6. Furthermore, in the exemplary embodiment shown, the spring axis 11 extends centrally between the two first abutment sections 7 and/or the two spring sections 9. The elastic force running along the spring axis 11 thus acts along the insertion direction AR in such a way that it presses the two components 2, 3 apart. The fastening device 12, which in the exemplary embodiment shown is formed from the two interconnected housing sections 21, 22, acts against the elastic force, as the result of which the pressure contact may be maintained. The two housing sections 21, 22, as illustrated, may be welded together, for example, thus forming a housing of the electrical component unit 1.

FIG. 3 shows a schematic sectional side view of an electrical component unit 1 in an assembled state according to an alternative exemplary embodiment. Similarly to the exemplary embodiment in FIGS. 1 and 2, here as well only a portion of the first component 2 and of the second component 3 are illustrated. In addition, only one of the contact devices 4 is illustrated, in this exemplary embodiment as well it being possible for the electrical component unit 1 to have multiple, in particular two, contact devices 4. Furthermore, the illustration of the fastening device 12, which may be designed similarly to the exemplary embodiment in FIGS. 1 and 2, has been omitted.

Here as well, the contact device 4 includes the at least one spring section 9. In the exemplary embodiment shown, the contact device 4 is illustrated in cross section, centrally normal to the longitudinal direction LR, for which reason only the one spring section 9 is illustrated. The contact device 4 preferably has a design that is symmetrical with respect to the section plane selected here, for which reason the contact device 4 in this exemplary embodiment as well includes two spring sections 9 designed as spring arms. The first abutment section 7, which together with the second abutment section 8 of the second component 3 forms the pressure connection, is provided at the end of each spring section 9.

In contrast to the preceding exemplary embodiments, the second plug connector 6 of the first component 2 and the second abutment section 8 of the second component 3 are spaced apart from one another along the transverse direction QR as well as along the insertion direction AR. This distance may also be referred to as an offset. The contact device 4 includes a compensation section 14 for bridging the distance. In the illustrated exemplary embodiment, the compensation section 14 is designed as a compensation loop.

Furthermore, in the exemplary embodiment shown, the contact device 4 includes a support section 15. With the aid of the support section 15, the contact device 4 may be supported on the first component 2 in such a way that the individual spring axes 10 and/or the spring axis 11 act(s) along the insertion direction AR. The course of the individual spring axes 10 and/or of the spring axis 11 may be altered or adapted by use of the support section 15. For this purpose, a corresponding support element 16 may be situated at the first component 2, the support section 15 resting against the support element when pressure contact is formed, i.e., in the assembled state. In the exemplary embodiment shown, the spring axis 11, due to the abutment of the support section 15, extends between the support element 16 of the first component 2 and the second abutment section 8 of the second component 3.

It is likewise conceivable for the support section 15 to rest directly against the first component 2, thereby being supported. Additionally or alternatively, it is conceivable for the first component 2 to have a shape corresponding to that of the support element 16. It is also conceivable for the compensation section 14 to additionally or alternatively compensate for an offset along the longitudinal direction LR.

FIG. 4 shows a schematic sectional side view of an electrical component unit 1 in an assembled state according to a further exemplary embodiment. Similarly to the exemplary embodiment in FIGS. 1 through 3, here as well only a portion of the first component 2 and of the second component 3 are illustrated. In addition, only one contact device 4 is illustrated, in this exemplary embodiment as well it being possible for the electrical component unit 1 to have multiple, in particular two, contact devices 4. Furthermore, the illustration of the fastening device 12, which may be designed similarly to the exemplary embodiment in FIGS. 1 and 2, has been omitted.

In contrast to the preceding exemplary embodiments, the contact device 4 includes a spring section 9 that is designed as a separate compression spring 17. In the exemplary embodiment shown, the contact device 4 is thus designed as a multi-part contact device 4 which includes the compression spring 17 and a contact element 18. The compression spring 17 rests against the support section 15 of the contact element 18, and brings about an elastic force that acts along the spring axis 11. In the exemplary embodiment shown, the contact element 18 includes the first plug connector 5, the compensation section 14, the support section 15, the at least one spring section 9, and the at least one first abutment section 7. Alternatively, it is conceivable for the contact element 18 to include no spring section, and for the contact device to form the pressure contact 4 by means of the spring section 9 designed as a separate compression spring 17.

FIG. 5 shows a schematic sectional side view of an electrical component unit 1 in an assembled state according to a further alternative exemplary embodiment. Similarly to the exemplary embodiment in FIGS. 1 through 4, here as well only a portion of the first component 2 and of the second component 3 are illustrated. In addition, only one contact device 4 is illustrated, in this exemplary embodiment as well it being possible for the electrical component unit 1 to have multiple, in particular two, contact devices 4. Furthermore, the illustration of the fastening device 12, which may be designed similarly to the exemplary embodiment in FIGS. 1 and 2, has been omitted.

In contrast to the preceding exemplary embodiments, the contact device 4 together with the contact element 18 and an additional element 19 is designed as a multi-part contact device 4. The contact element 18 includes the first plug connector 5 and the at least one first abutment section 7. The first abutment section 7 is designed as an abutment surface. The additional element 19 includes the at least one spring section 9 and the at least one second abutment section 8. The at least one second abutment section 8 is designed as an abutment end or abutment base. In addition, in contrast to the preceding exemplary embodiments, the at least one spring section 9 is situated at the additional element 19. For the electrical connection, the at least one first abutment section 7 of the contact element 18 is placed against the at least one second abutment section 8 of the additional element 19, thereby forming the pressure contact.

The additional element 19 is fastened to the second component 3 with the aid of a fastening section 20. In addition, the additional element 19 may be electrically connected to the second component 3 by means of the fastening section 20. When the second component 3 is the printed circuit board, the fastening section 20 may be in operative electrical connection with the strip conductors of the second component 3 designed as a printed circuit board, thus forming the closed circuit.

As illustrated in the exemplary embodiment in FIG. 5, the contact element 18 of the multi-part contact device 4 may also include the compensation section 14. Due to the first abutment section 7 designed as an abutment surface, this compensation section 14 may be designed as a simple extension of this abutment surface. The second abutment section 8 of the additional element 19 may thus rest against the first abutment section 7, designed as an abutment surface, over its entire length, thus forming the pressure contact.

FIG. 6 shows a schematic sectional side view of an electrical component unit 1 in an assembled state according to a further alternative exemplary embodiment. Only one contact device 4 is illustrated, in this exemplary embodiment as well it being possible for the electrical component unit 1 to have multiple, in particular two, contact devices 4.

The contact device 4 includes two spring sections 9, each of which presses the respective abutment sections 7, 8 together via the individual spring force that acts along the individual spring axis 10. In contrast to the preceding exemplary embodiments, the individual spring axes 10 form an acute angle with respect to the transverse direction QR. It may thus be ensured that the first abutment sections 7 of the contact device 4 in the transverse direction QR press against the second abutment sections 8 of the second component 3. The two individual elastic forces act opposite one another, essentially along the transverse direction QR or at the acute angle with respect to the transverse direction QR, so that the pressure contact is maintained.

It is also conceivable for only one of the first abutment sections 7 and/or one of the spring sections 9 to be situated at the contact device 4, and/or for one of the second abutment sections 8 to be situated at the second component 3. For maintaining the pressure contact, in such an exemplary embodiment the support section 15, the support element 16, and/or the compression spring 17 may be situated similarly to FIGS. 3 through 5. For this purpose, the support section 15, the support element 16, and/or the compression spring 17 may be adapted in such a way that the pressure contact along the transverse direction QR is maintained.

In addition, in the exemplary embodiment in FIG. 6 the second component 3 is designed as a lead frame and/or contact plate, which may be embedded in the second housing section 22 as shown in the exemplary embodiment. The second housing section 22 may thereby ensure the electrical insulation, with the electrical contacting of the second component 3 being enabled only at the at least one second abutment section 8 and/or at a plug outlet 24. Electrical power may be introduced into the electrical component unit 1 via the plug outlet 24, so that the first component 2 designed as a motor may be operated.

Since the second component 3 is embedded in the second housing section 22, these two parts are connected to one another in a non-displaceable manner along the insertion direction AR, the transverse direction QR, and the longitudinal direction LR. The first component 2, in particular the motor, is connected to the first housing section 21 in a non-displaceable manner only along the insertion direction AR. At least a slight movement, tilting, and/or rotation of the first component 2, in particular under load, along the longitudinal direction LR and/or the transverse direction QR may thus be ensured.

The present invention is not limited to the exemplary embodiments that are illustrated and described. Modifications within the scope of the claims are also possible, as well as a combination of the features, even if these are illustrated and described in different exemplary embodiments.

LIST OF REFERENCE SYMBOLS

1 electrical component unit
2 first component
3 second component
4 contact device
5 first plug connector
6 second plug connector
7 first abutment section
8 second abutment section
9 spring section
10 individual spring axis
11 spring axis
12 fastening device
13 free end
14 compensation section
15 support section
16 support element
17 compression spring
18 contact element
19 additional element
20 fastening section
21 first housing section
22 second housing section
23 fastening element
24 plug outlet
AR insertion direction
LR longitudinal direction
QR transverse direction

The invention claimed is:

1. A contact device for establishing an electrical connection between a first component and a second component, the contact device being different from the first component and different from the second component, comprising a first plug connector, which for forming a plug contact is pluggable onto a corresponding second plug connector of the first component, and comprising at least two first abutment sections, which for forming respective pressure contacts are pressable against a second abutment section of the second component, so that the contact device is electrically connected to the second component via multiple pressure contacts, at least two spring sections being provided between the first plug connector and the first abutment sections, the spring sections pressing the first abutment sections and the second abutment section against one another with an elastic force acting along a spring axis when the two components are electrically connected to one another, wherein the first plug connector is designed as a push-on sleeve, so that it is pluggable onto the second plug connector, designed as a plug, of the first component, wherein (i) the spring sections are arranged opposite one another and extend in opposite directions, from whose individual elastic forces and individual spring axes the elastic force, which acts along the spring axis, results, and/or (ii) the spring axis extends centrally with respect to the at least two first abutment sections.

2. The contact device according to claim 1, wherein the first plug connector has an open design along an insertion direction, the first plug connector, in the state in which it is plugged onto the second plug connector, extending beyond a free end of the second plug connector along the insertion direction.

3. The contact device according to claim 1, wherein the spring axis extends along the insertion direction, a longitudinal direction, and/or a transverse direction, and/or forms an acute angle with the insertion direction, the longitudinal direction, and/or the transverse direction.

4. The contact device according to claim 1, wherein the contact device includes a support section for supporting the contact device on the first component, the support section being situated at the first plug connector, between the first plug connector and the at least one spring section, and/or between the at least one spring section and the first abutment section.

5. The contact device according to claim 1, wherein the spring axis extends centrally with respect to at least one of the abutment sections, with respect to the first plug connector, and/or with respect to the support section.

6. The contact device according to claim 1, wherein the at least one spring section is designed as at least one bent spring arm, at the end of which the at least one abutment section is situated.

7. The contact device according to claim 1, wherein at least one of the abutment sections is designed as an abutment surface, abutment arc, abutment bracket, abutment point, and/or abutment end, and/or the at least one first abutment section rests directly against the at least one second abutment section of the second component.

8. The contact device according to claim 1, wherein the contact device has a one-part or multi-part design, the one-part contact device being designed as a contact element, and/or the multi-part contact device including, in addition to the contact element, a compression spring.

9. The contact device according to claim 1, wherein a contact element of the multi-part contact device includes the first plug connector and the at least one first abutment section.

10. The contact device according to claim 1, further comprising:

a compensation section connecting the first plug connector to the support section, to the spring section, and/or to the first abutment section, the compensation section being designed as a compensation loop.

11. The contact device according to claim 1, wherein the at least one spring section is designed as a leaf spring and/or compression spring, the spring section designed as a leaf spring forming a cohesive unit together with the first plug connector, the first abutment section, the second abutment section, the support section, and/or the fastening section, and/or the spring section designed as a compression spring acting on one of the abutment sections, the first plug connector, and/or the support section.

12. An electrical component unit, comprising a first component that includes at least one second plug connector, comprising a second component that has at least one second abutment section, and comprising a contact device for establishing an electrical connection between the first component and the second component, wherein the contact device is designed according to claim 1.

13. The electrical component unit according to claim 12, wherein the first plug connector is designed as a plug that protrudes from the first component in the insertion direction, and/or the second abutment section, situated at the second component, is designed as an abutment surface.

14. The electrical component unit according to claim 12, wherein at least one fastening device fastens the first component and the second component to one another in the insertion direction in a non-displaceable manner.

15. A method for manufacturing and/or installing an electrical component unit, comprising the following steps:

plugging a first plug connector of a contact device, designed according to claim 1, onto a corresponding second plug connector of a first component, forming a pressure contact between a first abutment section of the contact device and a second abutment section of the second component, so that the two components are electrically connected to one another by means of the pressure contact.

16. Use of a contact device, designed according to claim 1, in an electrical component unit, for establishing an electrical connection between a first component, and a second component.

17. A contact device for establishing an electrical connection between a first component and a second component, comprising a first plug connector, which for forming a plug contact is pluggable onto a corresponding second plug connector of the first component, and comprising at least one first abutment section, which for forming a pressure contact is pressable against a second abutment section of the second component and/or of an additional element that is connectable to the second component, at least one spring section being provided between the first plug connector and the first abutment section and/or between a fastening section of the additional element and the second abutment section, the spring section pressing the two abutment sections against one another with an elastic force when the two components are electrically connected to one another, wherein the first plug connector is designed as a push-on sleeve, so that it is pluggable onto the second plug connector, designed as a plug, of the first component, wherein the additional element is fastened to the second component in a non-displaceable manner, by means of the fastening section.

* * * * *